United States Patent [19]
Dobrott

[11] 3,756,056
[45] Sept. 4, 1973

[54] METHOD AND APPARATUS FOR ALIGNING WELDED GIRDERS

[75] Inventor: Werner Dobrott, Dortmund-Brackel, Germany

[73] Assignee: Hoesch Aktiengesellschaft, Dortmund, Germany

[22] Filed: July 23, 1971

[21] Appl. No.: 165,647

[30] Foreign Application Priority Data
July 24, 1970 Germany............ P 20 36 707.1

[52] U.S. Cl. .................. 72/164, 72/171, 219/102
[51] Int. Cl. .......................................... B21d 1/02
[58] Field of Search ............. 72/171, 173, 175, 72/170, 160, 164; 29/446, 480; 219/102

[56] References Cited
UNITED STATES PATENTS
3,634,644  1/1972  Ogden............................... 219/102
3,422,652  1/1969  Lorenz.............................. 72/164
1,942,992  1/1934  Yates................................ 72/171
1,144,459  6/1915  Burman............................ 72/171
2,335,028  11/1943  Rose et al. ..................... 72/173 X Primary Examiner—Milton S. Mehr
Attorney—Walter Becker

[57] ABSTRACT

An apparatus for compensating for the bending which takes place in a welded beam, particularly a nonsymmetrical welded beam having a web element with a chord element welded thereto. According to the disclosure of the present invention, the beam is caused to bend in a direction toward the chord element side of the web element and, while bent, is rolled between a pair of rollers so that the stress in the region of the weld of the beam, and which is made up of the bending stress plus the rolling stress, exceeds the elastic limit of the material from which the beam is made and thus compensates for the shrinkage in the weld region due to cooling of the weld.

17 Claims, 9 Drawing Figures

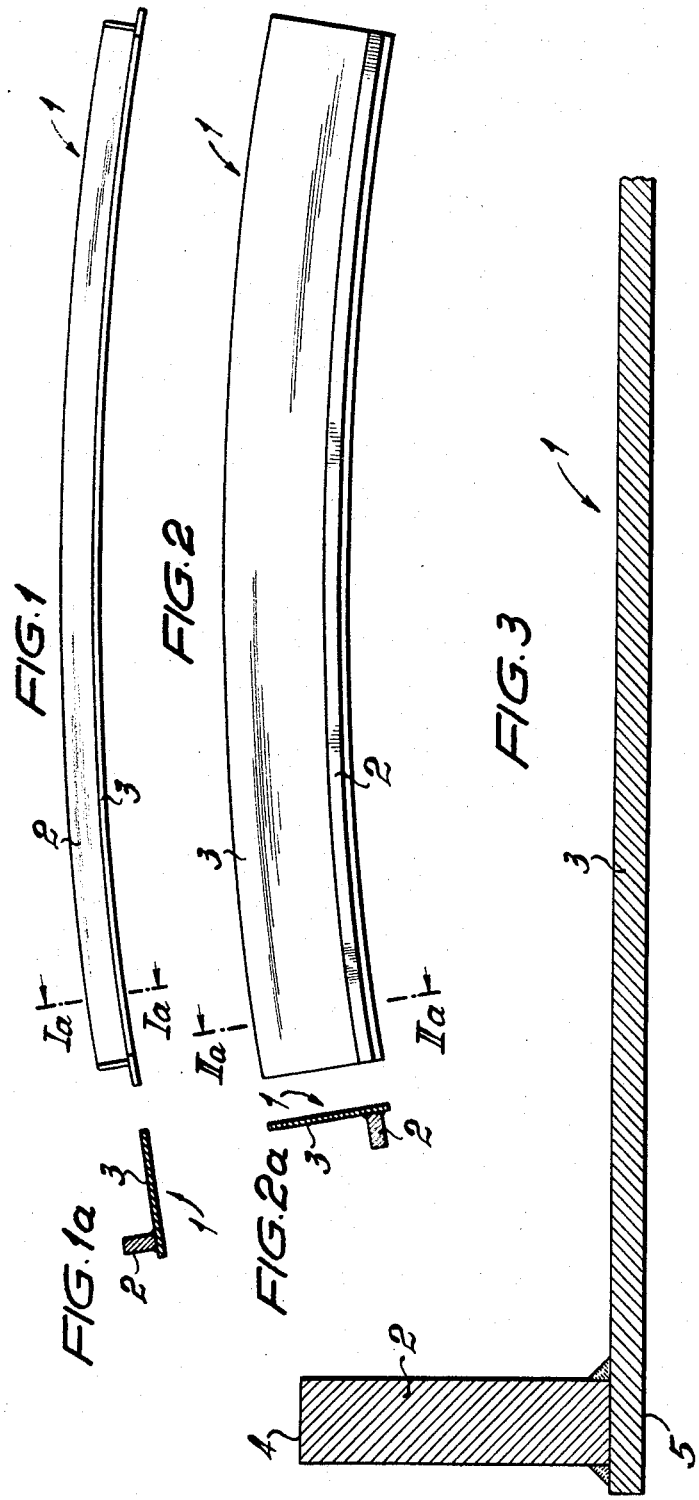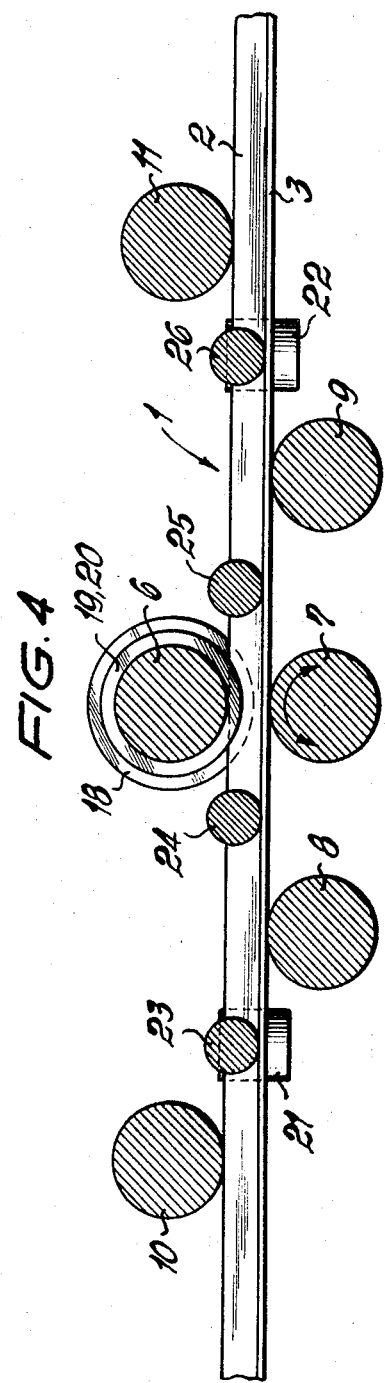

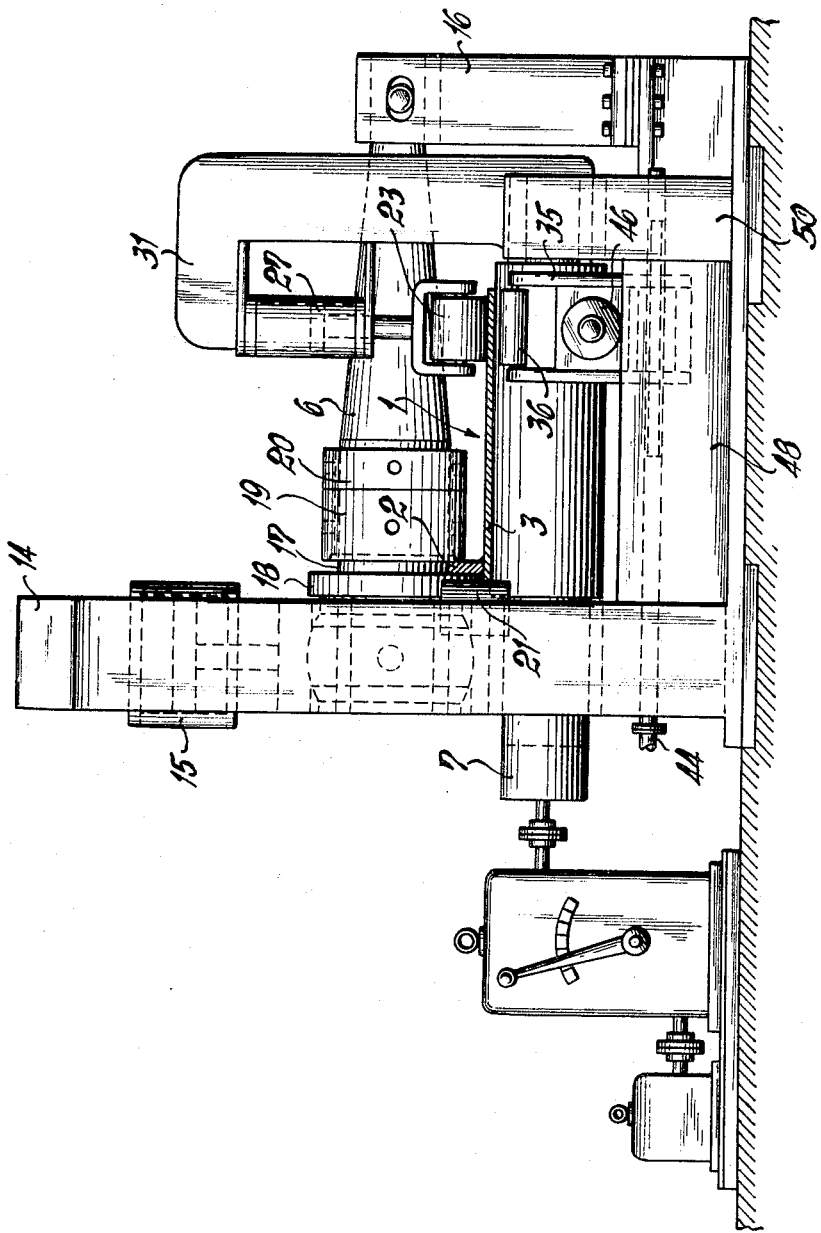

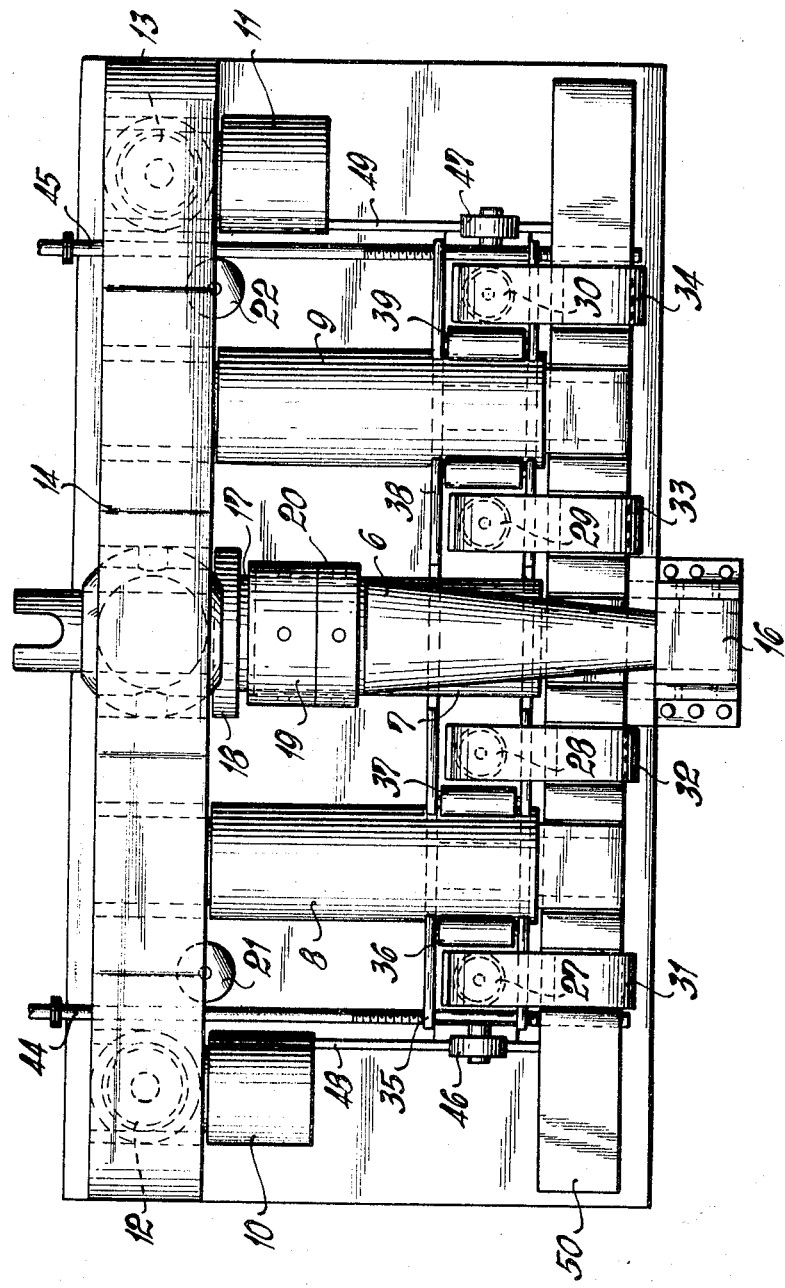

METHOD AND APPARATUS FOR ALIGNING WELDED GIRDERS

The present invention relates to a method and apparatus for aligning in a continuous manner welded non-symmetric girders, especially angle sections.

Welded non-symmetrical angle sections are employed as spars in ship building and are welded to the skin of the ship.

Welded profiles or sections get distorted by the shrinking stresses which occur when the welding seams cool down. By nonsymmetrical welded profiles, for instance, angular sections, this brings about a distortion primarily in two planes, namely, to the so-called sword form in the horizontal plane and to the arching of the chord in the vertical plane perpendicular thereto. Of minor importance is the inclination of the chord with regard to the longer portion of said chord being placed upon the web in spaced relationship to the web edge. This is due to the fact that this inclination can be kept within limits by a corresponding negative placement of the chord.

Heretofore, these spars were aligned in an aligning mechanism in which the shrinking was eliminated by milling or pressing and by bending the web upwardly. With this method, however, it cannot be avoided that in view of the design of the rollers, the forces are conveyed to the profile by a lever arm through the welding seams, inasmuch as the point of attack of the forces is located at the chord. Consequently, very high shearing forces are introduced into the welding seam and tears in the seam are frequently the result.

There has also become known a method for high edge aligning and bending of flat chord bars for ship building by a unilateral stretching by means of rollers, in which for instance, the bar is within the region of its longitudinal edges stretched by being subjected to a multiple passage. This treatment can merely with completely symmetrical cross sections being about an elimination of possible curvatures in the horizontal plane. A curvature which might be present in the vertical plane will, however, be completely maintained and has to be eliminated in a post or intermediate aligning system.

An aligning of non-symmetric, for instance, angular welded beams does not occur, inasmuch as due to the unilateral displacement of the center of gravity at the confining surface adjacent to the center of gravity a greater force would be required.

It is therefore, an object of the present invention to provide the possibility of aligning welded non-symmetric girders, especially angular sections in one working operation in such a way that distortion or warping caused by the shrinking will be eliminated in a horizontal as well as in a vertical plane.

This object and other objects and advantages of the invention will appear more clearly from the following specification, in connection with the accompanying drawings, in which:

FIG. 1 shows the distortion in a vertical plane of a welded non-symmetrical angle profile or angular section.

FIG. 1a is a cross sectional view taken at line Ia — Ia of FIG. 1.

FIG. 2 shows the distortion of the angle profile of FIG. 1 in a horizontal plane.

FIG. 2a is a cross sectional view taken at line IIa — IIa of FIG. 2.

FIG. 3 shows the angular section of FIG. 1 in cross section and on a larger scale than in FIG. 1.

FIG. 4 illustrates the arrangement of the bending and aligning rollers as well as of the rolling mill.

FIG. 6 is a side view of the device of FIG. 5.

FIG. 7 shows a top view of the device of FIG. 5.

Figure 5:
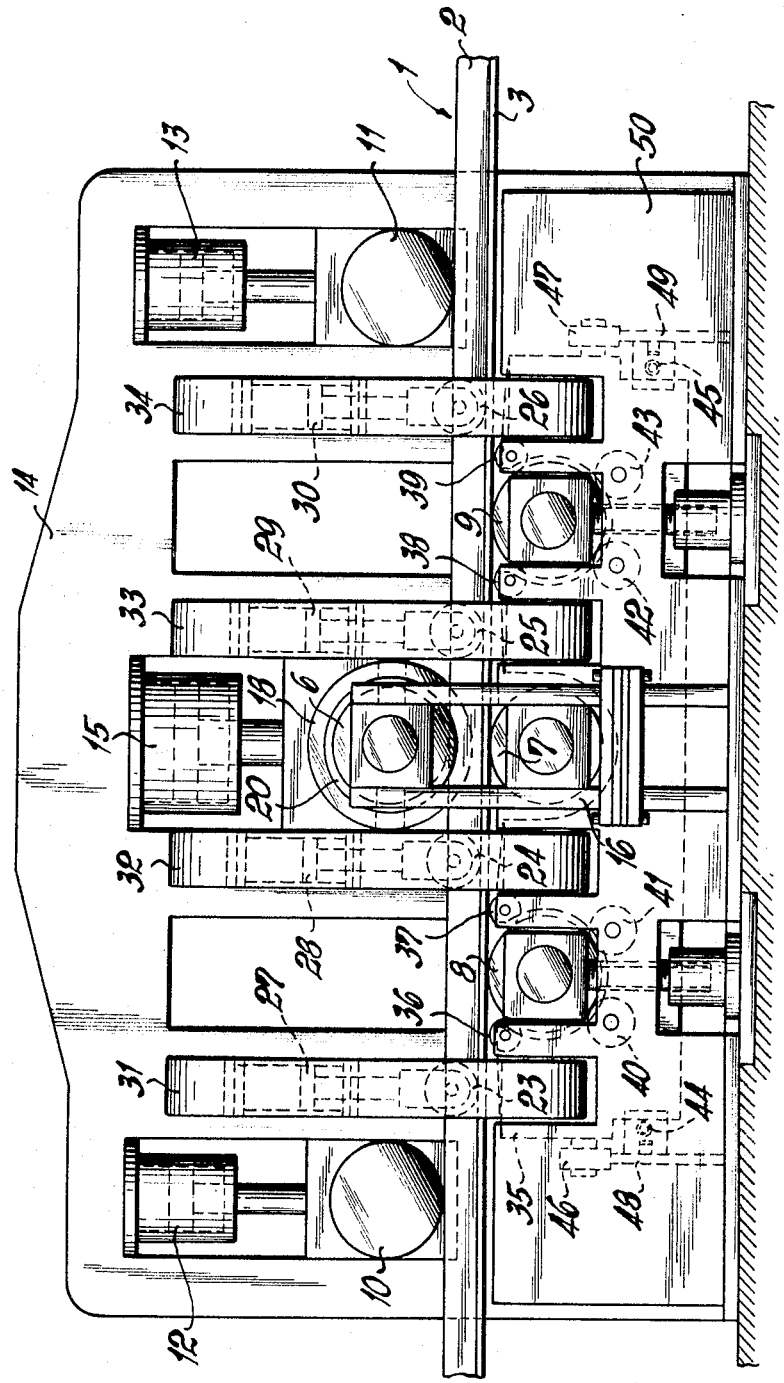
FIG. 5 illustrates by way of a front view the device for the aligning of the girders.

The method and device according to the present invention for aligning in a continuous manner welded non-symmetrical girders, especially angular sections is characterized primarily in that the web within the range of the connecting cross section of the chord will simultaneously be bent and rolled while the rolling is effected in the bending plane.

The device for carrying out the method according to the invention is characterized primarily in that a rolling mill or rolling mechanism is arranged between two bending rolls, said rolling mill or roller mechanism comprising two rolls. With such rolling mill or rolling mechanism, the upper roller is adjustable relative to the rolling operation whereas the drive of the rolling mechanism or rolling mill is effected through a lower stationary roller.

Inasmuch as the chord is not always precisely vertical to the web, the upper roller is provided with a groove, the lateral confinement of which is effected by a rim and adjustable rings.

In order to be able to align angular sections with different chord width, it is important that the upper roller has that side thereof which faces away from the groove journaled in a stand for oscillation. The rolling pressure necessary for the rolling process is obtained by the fact that the free end of the upper roller can be vertically adjusted by a hydraulic working cylinder. The bending of the profile will be assured by making the bending roller vertically adjustable.

The moving profile will move along a horizontal plane due to the fact that additional rollers are provided which act upon the chord. That side of the web which is not provided with a chord is aligned due to the fact that between one roller and the upper roller and between the other roller and the upper roller there are provided two aligning rollers acting upon the web. The welded profiles are guided in a right angle to the rollers due to the fact that in the plane of the outer rollers there is arranged a vertically adjustable mounted guiding roller each.

In order to be able to align distortions of different degrees of that side of the web which is not provided with a chord, it is provided according to the invention that a hydraulic cylinder each is, by means of a C-shaped stand provided with a jaw which by means of supporting rollers rests on the bending rollers.

In order to be able to align welded profiles with different web heights, it is provided that when the bending rollers move downwardly, a lateral jaw rests by rollers upon rails so that a transverse adjustment can be effected by means of a feed rod.

Referring now to the drawings in detail, FIG. 1 shows the vertical and FIG. 2 shows the horizontal distortion of the welded non-symmetric angle section 1. FIG. 3 shows in connection with a welded non-symmetric angle section that the ratio of chord width of the chord 2 to the height of the web 3 is within the range of from 1:3 to 1:10 whereas the ratio of web thickness to chord thickness is approximately within the range of 1:3. The causes for the distortion are seen in the local shortening of the length as a result of the cooling off of the welding seams. It is the very object of the present invention to undo the said occurred shrinkage in the transition area of the welded seam within the region of the connecting cross section of chord 2 (FIG. 3). This is effected in cold condition and in one working cycle.

Experience has shown that to this end the superimposing of two working steps is necessary. On one hand, a high edge bending of the chord 2 is effected which brings about a load up to the elastic limit whereby in the marginal area 4 a compression stress and in the marginal area 5 a pull stress occurs. On the other hand a simultaneous rolling is effected whereby the rolling force is vetically directed toward the chord so that a change in length occurs whereby the stresses occur during the bending and rolling in the marginal area 4 are cancelled, and in the marginal area 5 the pull stress resulting from the bending step and the pull stress resulting from the rolling add to each other. The elastic limit is exceeded and a permanent expansion occurs within the region of the connecting cross section of chord 2 so that the reductions in the length in the marginal areas of the web as caused by the shrinkage will be undone and the profile will be brought into a straight condition.

In this connection, it is important that the rolling is carried out in the plane in which the greatest stresses caused by bending will occur, so that full advantage can be taken thereof.

As FIG. 4 shows, it is necessary to this end that the rolling system comprising the upper hydraulic adjustable roller 6 and the lower firmly journaled driven roller 7 are located centrally between the two mechanically vertically adjustable bending rollers 8, 9, and that the upper roller 6 serves simultaneously for the bending rollers 8, 9, as counter bending roller. In order to be sure that the passing profile moves horizontally along a plane, returning rollers 10 and 11 are provided which are adjustable by the hydraulic cylinders 12, 13. The profile is passed through the device by means of the roller 6, the speed of which is adjustable in an infinitely variable manner.

The roller pressure of the rolling mill or rolling mechanism is furnished by a hydraulic cylinder 15 built into a jaw 14, and this rolling pressure acts upon the upper roller 6 which is journaled in a stand 16 with one side adapted to oscillate as is clearly evident from FIG. 6. By correspondingly adjusting the stand as to height, it is possible to process different chord widths. Chord 2 of the non-symmetric angle section 1 is guided in a groove 17 which is formed by a rim ring 18 and adjustable rings 19, 20 so that the chord 2 can be kept vertically during the rolling operation and not be folded. The adjustable rings may be, for instance, in the form of a nut and counter nut.

The groove width is set in conformity with the respective thickness of the chord. The bottom of the groove represents the working surface proper of the roller.

In order to make sure that the angle section 1 is guided at a right angle to the rolling mechanism or rolling mill, vertically mounted and horizontally adjustable guiding rollers 21 and 22 are provided.

In order to prevent the angle section 1 from tilting upwardly and in order to align that side of the web which is not provided with a chord, there are provided aligning rollers 23, 24, 25 and 26, which are connected through hydraulic cylinders 27, 28, 29 and 30, and to C-shaped stand 31, 32, 33 and 34. In view of a particular design of the device according to the invention, there exists the possibility also to align angle profiles of different web height. This is made possible by having bending rollers 8, 9 support lateral jaw 35 to which the C-shaped stands are connected. In order to set the device for the necessary width, the bending rollers 8 and 9 have to be returned completely. In this way, the supporting rollers 36, 37, 40, 41 and 38, 39, 42 and 43 which are arranged in traverses around the bending rollers 8, 9 on the lateral jaw 35 and which support the C-shaped stands by the lateral jaw 35 are relieved and have a certain play so that the lateral jaw 35 is adapted to be adjusted transversely by motor driven feed rods 44, 45. In this position, the lateral jaw 35 is no longer carried by the bending rollers 8, 9. During the adjusting operation, the lateral jaw 35 rests by rollers 46, 47 on rails 48, 49, which at the same time serve as transverse beams between the jaw 14 and the side 50 of the device located opposite said jaw 14.

It is of particular advantage when carrying out an aligning operation according to the method of the present invention to see to it that the material is stressed only where it actually shrinks, namely, within the region of the welding seam so that the occurring cold solidification is locally limited by the rolling step. Therefore, when welding the webs to the skin of the ship, a danger of artificially aging does not exist.

It is, of course, to be understood that the present invention is, by no means, limited to the particular showing in the drawings, but also comprises any modifications within the scope of the appended claims.

What is claimed is:

1. The method of making a nonsymmetrical welded beam, especially an angle section having a web element and a chord element welded thereto which comprises: simultaneously bending and rolling said beam subsequent to the welding thereof to compensate for distortion due to the welding operation, said chord element being disposed at right angles to said web element and said bending of said beam being in a direction perpendicular to the plane of said web element and in a direction such that the chord element is substantially on the concave side of the beam during the bending.

2. The method according to claim 1 in which said rolling is accomplished by rollers pressed against said beam from opposite sides thereof in the direction of the plane of said chord element and while said beam is subjected to bending stress.

3. The method according to claim 2 in which the stress due to bending of said beam and the stress due to the rolling thereof are additive in the region where the chord element is welded to the web element and the sum of the stresses in said region exceeds the elastic limit of the material of the beam.

4. The method according to claim 3 which includes laterally confining at least said web element in the plane thereof during said bending and rolling of the beam.

5. An apparatus for treating a welded nonsymmetrical beam which has a web element and a chord element perpendicular thereto and welded to the web element, said apparatus comprising: a frame, a plurality of rollers distributed in said frame along a path along which the beam is moved while engaged on opposite sides by said rollers, said rollers including a first pair of rollers opposed to each other and pressed toward each other to develop rolling stresses in said beam, and a second pair of rollers spaced from each other along the length of said beam and on opposite sides of said first pair of rollers and on the same side of said beam and cooperating with the one of said first pair of rollers on the opposite side of said beam to develop bending stresses in the beam, said one of said first pair of rollers being formed with a radial annular groove to receive said chord element, one side wall of said groove being formed by a rim member adjustable axially on the said roller.

6. An apparatus according to claim 5 in which said one of said first pair of rollers is adjustable in said frame.

7. An apparatus according to claim 5 in which the other of said first pair of rollers is driven to cause the beam to advance through the apparatus.

8. An apparatus for treating a welded nonsymmetrical beam which has a web element and a chord element perpendicular thereto and welded to the web element, said apparatus comprising: a frame, a plurality of rollers distributed in said frame along a path along which the beam is moved while engaged on opposite sides by said rollers, said rollers including a first pair of rollers opposed to each other and pressed toward each other to develop rolling stresses in said beam, and a second pair of rollers spaced from each other along the length of said beam and on opposite sides of said first pair of rollers and on the same side of said beam and cooperating with the one of said first pair of rollers on the opposite side of said beam to develop bending stresses in the beam, a fluid motor acting on said one of said first pair of rollers in a direction toward the other of said first pair of rollers and in the region of the axial length of said one roller near the point of engagement thereof with said chord element.

9. An apparatus according to claim 8 which includes means in said frame supporting said one of said first pair of rollers therein while permitting axial movement of said one roller in the frame.

10. An apparatus according to claim 8 in which said second pair of rollers are adjustable in said frame to vary the bending stress developed in said beam.

11. An apparatus according to claim 8 in which said rollers include further rollers on the opposite side of the beam from said second pair of rollers and spaced therefrom on the sides thereof opposite said first pair of rollers.

12. An apparatus according to claim 8 which includes aligning rollers engaging the beam on the same side as said further rollers and located between said further rollers and said one of said first pair of rollers.

13. An apparatus according to claim 12 which includes guiding rollers engaging said beam in the region of said aligning rollers and rotatable on axes perpendicular to the axes of said guiding rollers.

14. An apparatus according to claim 12 which includes stands supporting said aligning rollers, and support rolls on said stands in the region of said second pair of rollers operable to support the stands on said second pair of rollers.

15. An apparatus for treating a welded nonsymmetrical beam which has a web element and a chord element perpendicular thereto and welded to the web element, said apparatus comprising: a frame, a plurality of rollers distributed in said frame along a path along which the beam is moved while engaged on opposite sides by said rollers, said rollers including a first pair of rollers opposed to each other and pressed toward each other to develop rolling stresses in said beam, and a second pair of rollers spaced from each other along the length of said beam and on opposite sides of said first pair of rollers and on the same side of said beam and cooperating with the one of said first pair of rollers on the opposite side of said beam to develop bending stresses in the beam, aligning rollers engaging the beam of the same side as said further rollers and located between said further rollers and said one of said first pair of rollers, stands supporting said aligning rollers, and support rolls on said stands in the region of said second pair of rollers operable to support the stands on said second pair of rollers, rails in said frame extending laterally to the path of movement of said beam, and further support rolls on said stands engageable with said rails from above.

16. An apparatus according to claim 15 which includes means in the frame for adjusting said second pair of rollers therein toward and away from the path of said beam and other means in the frame for adjusting said stands laterally toward and away from said path.

17. An apparatus according to claim 16 which includes fluid motors in said stands to urge the aligning rollers thereon toward the path of said beam.

* * * * *